United States Patent Office 2,912,445
Patented Nov. 10, 1959

2,912,445

SUBSTITUTED BENZENESULFONYL-HYDRAZONES (H)

Hans Willi Zimmer, Cincinnati, Ohio, assignor to The Chattanooga Medicine Company, Chattanooga, Tenn., a corporation of Tennessee No Drawing. Application July 1, 1958
Serial No. 745,826

4 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display antibacterial activity.

It is, therefore, an important object of the instant invention to provide new and useful substituted benzenesulfonylhydrazones.

It is another object of the instant invention to provide new and useful nitro-, amino- or acetamidobenzenesulfonylhydrazones of certain aromatic aminoaldehydes or ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the following formula:

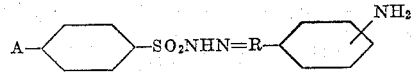

wherein A is a monovalent radical selected from the group consisting of —NH$_2$, —NO$_2$, and —NHCOCH$_3$, R is a C$_1$–C$_6$ aliphatic group, and each X is selected from the group consisting of H and a C$_1$–C$_6$ alkyl group.

As indicated, X is H or a straight chain or branched chain alkyl group having one to six carbon atoms, such as methyl, ethyl, propyl, isopropyl, n-butyl, isobutyl, sec.-butyl, tert.-butyl, amyl, isoamyl, n-hexyl, isohexyl, etc. Preferably, X is H or a C$_1$–C$_4$ alkyl group. Preferably, also, the amino group NX$_2$ is in the para position.

As indicated, the radical A may be amino-, nitro- or acetamido, so that the instant compounds are p-aminobenzenesulfonylhydrazones, p-nitrobenzenesulfonylhydrazones, or p-acetamidobenzenesulfonylhydrazones of the aromatic amino aldehydes or ketones herein specified.

The radical R is a trivalent aliphatic group having one to six carbon atoms, which may be a saturated or unsaturated straight chain or branched chain hydrocarbon group; but preferably R does not have more than one olefinic unsaturation. R may thus be:

=CHCH=CH—, as in aminocinnamaldehyde;

=C—CH$_2$CH$_2$—, as in aminobenzylacetone;
  |
  CH$_3$

=C—CH$_2$—, as in aminophenylacetone;
  |
  CH$_3$

=C—CH$_2$—, as in ethyl aminobenzyl ketone;
  |
  C$_2$H$_5$

=C—, as in butyl aminophenyl ketone;
  |
  C$_4$H$_9$

=C—CH$_2$—, as in butyl aminobenzyl ketone;
  |
  C$_4$H$_9$

Typical compounds of the invention include the following:

p - Nitrobenzenesulfonylhydrazone of p - aminoacetophenone:

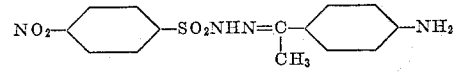

p-Nitrobenzenesulfonylhydrazone of p-dimethylaminobenzaldehyde:

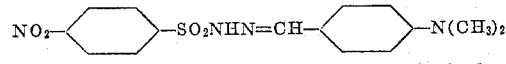

p-Nitrobenzenesulfonylhydrazone of p-aminohydrocinnamaldehyde:

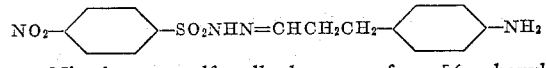

p - Nitrobenzenesulfonylhydrazone of p - [(n - hexyl)-amino]benzylacetone:

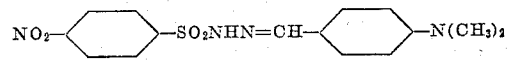

p-Aminobenzenesulfonylhydrazone of p-dimethylaminobenzaldehyde:

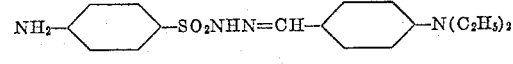

p-Aminobenzenesulfonylhydrazone of p-diethylaminobenzaldehyde:

NH$_2$—⟨ ⟩—SO$_2$NHN=CH—⟨ ⟩—N(C$_2$H$_5$)$_2$ p-Aminobenzenesulfonylhydrazone of n-butyl p-aminobenzyl ketone:

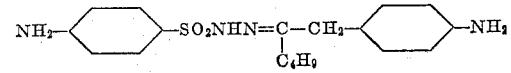

p-Aminobenzenesulfonylhydrazone of p-aminophenylacetone:

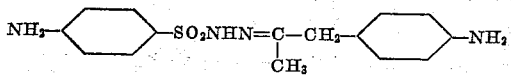

p-Acetamidobenzenesulfonylhydrazone of p-dimethylaminobenzaldehyde:

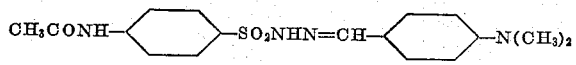

p-Acetamidobenzenesulfonylhydrazone of p-aminoacetophenone:

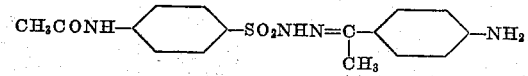

p-Acetamidobenzenesulfonylhydrazone of p-dimethylamino hydrocinnamaldehyde:

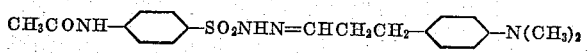

p-Acetamidobenzenesulfonylhydrazone of n-propyl p-aminobenzyl acetone:

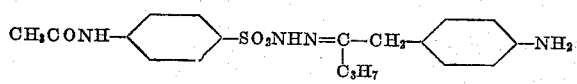

Example 1 p-Acetamidobenzenesulfonylhydrazine (0.04 mol) is dissolved in 500 ml. of hot water (at 70° C.). p-Dimethylaminobenzaldehyde (0.04 mol) is added to the hot water solution, with vigorous stirring, and such stirring is continued as the solution cools to room temperature. During this cooling period, crystals begin separating from the reaction mixture. After two hours, the crystals are collected on a suction filter and dried in an oven at 95° C. The product is re-crystallized from a mixture of three parts of methanol and two parts of water, to yield a substantially pure product in the form of pale pink crystals which melt with decomposition at 219.5–220° C. Analysis for p-acetamidobenzenesulfonylhydrazone of p-dimethylaminobenzaldehyde: calculated for $C_{17}H_{20}N_4O_3S$ is C=56.65, H=5.59; found: C=56.60, H=5.66.

Example 2

A procedure is carried out that is the same as that of Example 1, except that p-aminoacetophenone is used in place of the p-dimethylaminobenzaldehyde and the result is a white crystalline product having a melting point of 206–207° C. Analysis for p-acetamidobenzenesulfonylhydrazone of p-aminoacetophenone: calculated for $C_{16}H_{18}N_4O_3S$ is C=55.47, H=5.24, N=16.17; found: C=55.30, H=5.47, N=16.27.

Example 3 p-Aminobenzenesulfonylhydrazine (0.04 mol) is dissolved in a hot solution composed of 50 ml. of methanol and 50 ml. of water. p-Aminoacetophenone (0.04 mol) is added to the hot solution, with vigorous stirring, and such stirring is continued as the solution cools to room temperature. During this cooling period, crystals begin separating from the reaction mixture, and their separation is facilitated by the addition of 100 ml. of water as a diluent. The crystals are collected on a suction filter and dried in an oven at 95° C. The resulting product is a white crystalline material having a melting point of 196–197° C. Analysis for p-aminobenzenesulfonylhydrazone of p-aminoacetophenone: calculated for $C_{14}H_{16}N_4O_2S$ is C=55.24, H=5.30, N=18.41; found, C=55.02, H=5.25, N=18.21.

Example 4

A procedure is carried out that is the same as that of Example 3, except that p-dimethylaminobenzaldehyde is used in place of the p-aminoacetophenone and the resulting product is a yellow crystalline material melting with decomposition at 186.5–187° C. Analysis for p-aminobenzenesulfonylhydrazone of p-dimethylaminobenzaldehyde: calculated for $C_{15}H_{18}N_4O_2S$ is C=56.48, H=5.70, N=17.60; found, C=56.40, H=5.69, N=17.64.

Example 5

A procedure is carried out that is the same as that of Example 3, except that p-diethylaminobenzaldehyde is employed in place of the p-aminoacetophenone and the resulting product is a yellow crystalline material melting with decomposition at 176–177° C. Analysis for p-aminobenzenesulfonylhydrazone of p-diethylaminobenzaldehyde: calculated for $C_{17}H_{22}N_4O_2S$ is C=58.94, H=6.40, N=16.17; found, C=58.76, H=6.58, N=16.12.

The procedure of Examples 1 and 2 may be used to produce any of the other p-acetamidobenzenesulfonylhydrazones of the invention; and the procedures of Examples 3, 4 and 5 may be used to produce any other p-aminobenzenesulfonylhydrazones of the invention.

Example 6 p-Nitrobenzenesulfonylhydrazine (0.025 mol) is slurried, with stirring, in 50 ml. of warm methanol. p-Dimethylaminobenzaldehyde (0.025 mol) is added slowly, with vigorous stirring; and after the mixture becomes homogeneous, 20 ml. of water is added. The reaction mixture is allowed to stand overnight and the crystals then separated are collected on a suction filter and dried in an oven at 95° C. The resulting product is a red crystalline material melting with decomposition at 166.5–167° C. Analysis for p-nitrobenzenesulfonylhydrazone of p-dimethylaminobenzaldehyde: calculated for $C_{15}H_{16}N_4O_4S$ is C=51.71, H=4.63; found: C=52.07, H=4.70.

The other p-nitrobenzenesulfonylhydrazones of the invention may be prepared by the same reaction using corresponding aldehydes and ketones in place of the p-dimethylaminobenzaldehyde.

In general, the compounds of the instant invention are prepared by reacting the aldehyde or ketone with the p-acetamidobenzenesulfonylhydrazine, p-nitrobenzenesulfonylhydrazine, or p - aminobenzenesulfonylhydrazine. The reaction is carried out advantageously in a solvent; and the solvents preferably used are water, alcohol, dioxane, or mixtures thereof. The aforementioned hydrazines are relatively insoluble in these solvents; and the reaction is facilitated by the application of external heat and stirring. The particular hydrazine to be used is first placed in the solvent and heat is applied; then substantially an equal molar quantity of the aldehyde or ketone is added, preferably a small amount at a time with stirring, until the reaction is completed, as evidenced by a homogeneous appearance of the reaction mixture. The entire reaction period is but a few minutes (for example, 5 to 10 minutes). The product separates from the reaction mixture on cooling to room temperature and is easily separated; and the product may be re-crystallized from alcohol, water, dioxane or a mixture thereof to yield a relatively pure product.

The compounds of the invention just described show peak absorptions of light radiation in the neighborhood of 2970 A. and low absorption of light radiation in the neighborhood of 3400 A., so that they may be used in sun tan lotions. These compounds also undergo decomposition upon melting; and, with respect to anti-bacterial activity, it will be noted that, for example, p-aminobenzenesulfonylhydrazone of p-aminoacetophenone exhibits anti-bacterial activity with respect to *Escherichia coli*.

Example 7

A procedure is carried out that is the same as that described in Example 1, except that p-diethylaminobenzaldehyde is used in place of the aldehyde used in Example 1 and the resulting product is in the form of tan needles melting with decomposition at 187–188° C. Analysis for p-acetamidobenzenesulfonylhydrazone of p-diethylaminobenzaldehyde: calculated for $C_{19}H_{24}N_4O_3S$ is C=58.74, H=6.23, N=14.42; found: C=58.79, H=6.36, N=14.54.

It will be understood that modifications and variations may be effected without departing from the spirit and scope of the novel concepts of the present invention.

I claim as my invention:

1. A compound having the following formula:

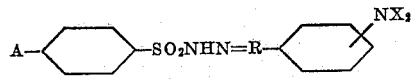

wherein A is a monovalent radical selected from the group consisting of —$NH_2$, —$NO_2$, and —$NHCOCH_3$, R is a $C_1$–$C_6$ aliphatic group, and each X is selected from the group consisting of H and a $C_1$–$C_6$ alkyl group.

2. p - Aminobenzenesulfonylhydrazone of p - aminoacetophenone.

3. p - Nitrobenzenesulfonylhydrazone of p - dimethylaminobenzaldehyde.

4. p-Acetamidobenzenesulfonylhydrazone of p-aminoacetophenone.

References Cited in the file of this patent

Curtius et al.: J. Prakt. Chem., vol. 112, pp. 118–119, 127 and 132 (1926).

Chemical Abstracts, vol. 41, pp. 5475–5477 (1941).

UNITED STATES PATENT OFFICE
CERTIFICATE OF CORRECTION

Patent No. 2,912,445　　　　　　　　　　　November 10, 1959

Hans Willi Zimmer

It is hereby certified that error appears in the printed specification of the above numbered patent requiring correction and that the said Letters Patent should read as corrected below.

Column 1, lines 66 to 68, the formula should appear as shown below instead of as in the patent:

Signed and sealed this 19th day of July 1960.

(SEAL)
Attest:

KARL H. AXLINE
Attesting Officer

ROBERT C. WATSON
Commissioner of Patents